Patented Sept. 26, 1939

2,174,390

UNITED STATES PATENT OFFICE 2,174,390

COMPOSITE BODY

Hans Pulfrich, Berlin-Wilmersdorf, Germany, assignor to General Electric Company, a corporation of New York No Drawing. Application June 22, 1937, Serial No. 149,666. In Germany August 12, 1936

4 Claims. (Cl. 49—92)

The present invention relates to a composite body suitable for the fabrication of vacuum tubes and similar devices having walls impervious to gas and is especially concerned with a new ceramic material.

When refractory metals such as tungsten or molybdenum are bonded or fusion-welded to ceramic materials by means of an interposed layer or body of glass, it is necessary to use ceramic materials having a coefficient of linear thermal expansion of $40.10^{-7}$ to $50.10^{-7}$ per degree centigrade. The usual porcelains that have such a thermal coefficient of expansion have a high alkali content and a structure consisting of crystals embedded in a vitreous matrix, and as a result have the defects of high dielectric loss and low mechanical strength.

The object of my invention is to provide a composite body wherein is utilized a ceramic material having a low dielectric loss and a coefficient of linear thermal expansion within the range of approximately $40.10^{-7}$ to $50.10^{-7}$ per degree centigrade.

In accordance with one aspect of my invention I prepare a composite body comprising a metallic member, a glass bonded to said metallic member, and sealed, for example by fusion welding, to said glass, a ceramic material comprising the product of firing at an elevated temperature a mixture comprising from about 10 to 40 per cent by weight of the whole of beryllium oxide and the remainder consisting of a mixture of hydrous magnesium silicate and hydrous aluminum silicate, said magnesium silicate constituting from about 25 to 40 per cent of said mixed silicates. It may be stated more particularly that the mixed ingredients of which the ceramic material is composed consist, by weight, of from about 10 to 40 parts beryllium oxide, from about 15 to 36 parts hydrous magnesium silicate and from about 36 to 67.5 parts hydrous aluminum silicate. Soapstone, steatite and talc are examples of naturally occurring non-metallic mineral substances comprising hydrous magnesium silicate which I may employ in making the ceramic material which is used in carrying this invention into effect. Kaolin, kaolinite and related non-metallic materials, which as found in nature consist mainly of hydrous aluminum silicate, may comprise the other component of the silicate mixture.

A more specific example of the composition of a ceramic material utilized in making composite bodies of this invention follows:

| | Parts by weight |
|---|---|
| Beryllium oxide | 35 |
| Kaolin | 48 |
| Steatite | 17 |

The specified components are wet or dry milled to form a uniform mixture, which is molded to the desired shape. The molded mass is fired at a temperature of about 1300° to 1400° C. thereby to produce a gas- or vacuum-tight ceramic body, that is to say, a body which is practically impervious to passage therethrough of gases. Such a ceramic material is of crystalline structure and possesses very good mechanical properties. Its dielectric angle of losses $tg\delta$ is smaller than $10.10^{-4}$. It may be sealed to glass, or by means of a glass member to a metallic member.

Composite bodies produced in accordance with the present invention have particular utility in electrical applications, in view of the low dielectric loss of the ceramic material made in accordance with my invention.

What I claim as new and desire to secure by Letters Patent of the United States, is:

1. A composite body comprising a metallic member, a glass bonded to said metallic member, and fusion-welded to said glass, a low dielectric loss ceramic material having a coefficient of linear thermal expansion not substantially exceeding $50.10^{-7}$ per degree centigrade and comprising the product of firing at an elevated temperature a mixture consisting by weight of from about 10 to 40 parts beryllium oxide, from about 15 to 36 parts hydrous magnesium silicate and from about 36 to 67.5 parts hydrous aluminum silicate.

2. A composite body comprising a glass member and a member composed of a low dielectric loss ceramic material having a coefficient of linear thermal expansion not substantially exceeding $50.10^{-7}$ per degree centigrade and consisting of the product of firing at an elevated temperature a mixture consisting by weight of from about 10 to 40 parts beryllium oxide, from about 15 to 36 parts hydrous magnesium silicate and from about 36 to 67.5 parts hydrous aluminum silicate, said members being sealed to one another.

3. In a composite body a low dielectric loss ceramic material composed of the product of firing at an elevated temperature a mixture consisting of by weight, from about 10 to 40 parts beryllium oxide, from about 15 to 36 parts hydrous magnesium silicate and from about 36 to 67.5 parts hydrous aluminum silicate, said ceramic material having a coefficient of linear thermal expansion not substantially exceeding $50.10^{-7}$ per degree centigrade.

4. In a composite body a ceramic material consisting of the product of firing at a temperature of about 1300° to 1400° C. a mixture consisting by weight of about 35 parts beryllium oxide, about 48 parts kaolin and about 17 parts steatite, said material having a dielectric angle of losses ($tg\delta$) smaller than $10.10^{-4}$ and a coefficient of linear thermal expansion of about $40.10^{-7}$ to $50.10^{-7}$ per degree centigrade.

HANS PULFRICH.